March 26, 1940.　　　　　K. SERAI　　　　　2,195,135
ROTARY STAMPING MACHINE
Filed Sept. 19, 1939　　　　3 Sheets-Sheet 1

INVENTOR
KIICHI SERAI
BY
Edgar H. Kent
ATTORNEY

March 26, 1940.   K. SERAI   2,195,135
ROTARY STAMPING MACHINE
Filed Sept. 19, 1939   3 Sheets-Sheet 3

INVENTOR
KIICHI SERAI
BY
Edgar H. Kent
ATTORNEY

Patented Mar. 26, 1940

2,195,135

UNITED STATES PATENT OFFICE 2,195,135

ROTARY STAMPING MACHINE

Kiichi Serai, Honolulu, Territory of Hawaii, assignor to Hawaiian Pineapple Company, Limited, Honolulu, Territory of Hawaii, a corporation of Hawaii Application September 19, 1939, Serial No. 295,592

8 Claims. (Cl. 101—35)

This invention relates to printing mechanism, and more particularly to a rotary printing mechanism adapted for use in a conveyer system for automatically stamping cartons, containers, or other articles advancing in spaced relation along the system. The automatic feature of my invention is afforded by reason of the operation of the printing mechanism by successive articles as they are carried on the conveyer past the printing mechanism.

Further advantages of my invention are the positive drive of the printing mechanism, the accuracy of the printing impression, both with regard to uniformity and distinctness, and the continuous operation with a minimum of attention.

Other objects of my invention will be referred to in the course of the following more detailed description of my invention, which is illustrated in the accompanying drawings, in which, Fig. 1 is a side elevation of a portion of a conveyer system, with my printing mechanism mounted thereon, and showing an article in one position on the conveyer;

Figure 1:
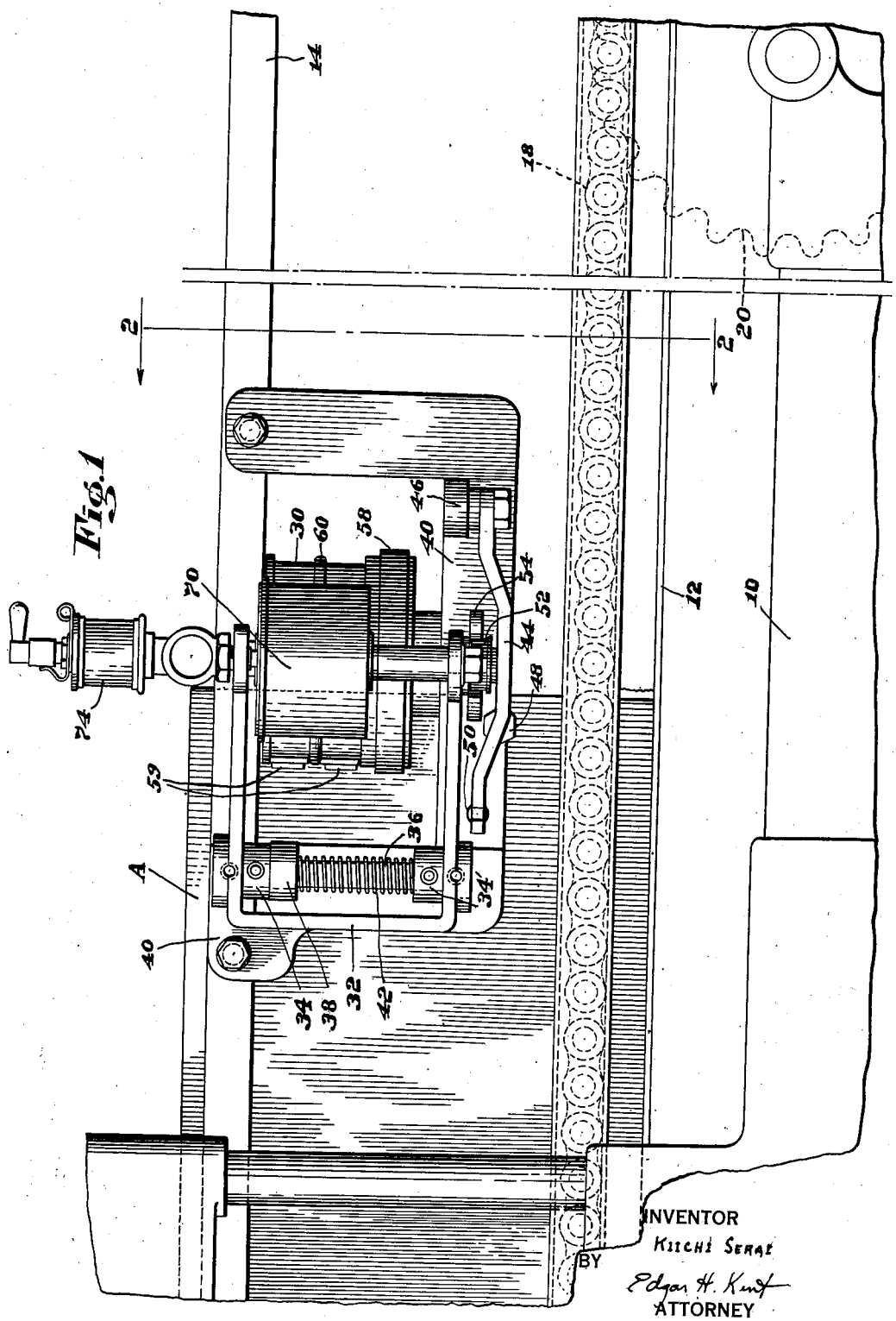

My printing mechanism is adapted for use with any conventional type of conveyer system, that shown in the drawings being a part of the conveyer system for a carton sealing machine of standard design. The conveyer system shown includes a frame 10 supporting a slide 12 along which the cartons A are advanced between adjustable guide rails 14 by means of pusher bars 16 connected to endless chains 18 operated along the sides of the slide by means of sprocket drive wheels 20 connected to a motor or other suitable source of power (not shown).

In the drawings, my printing mechanism is shown mounted on the frame of the conveyer system in a position suitable for stamping a side of the articles passing through the conveyer. The printing mechanism includes a rotary element 30, which is adapted to be advanced towards and away from the path of travel of the articles, and to be rotated by frictional engagement of an element of the printing mechanism with an article A as the article passes the printing station. The print holder, therefore, is mounted for a compound movement.

The movement of the rotary element toward and away from the path of travel will be described first. For this purpose, the rotary element 30 is journaled for rotation on a vertical axis in a yoke member 32, which in turn is mounted for pivotal movement in a horizontal plane. Such pivotal movement is permitted by pivotally mounting the yoke 32 by means of bearing sleeves 34 and 34' on a vertically disposed pin 36 fixedly mounted in a boss 38 projecting from an auxiliary frame 40, securely fixed to the conveyer frame 12 by two bolts secured in one of the upper longitudinal guides 14.

The pin 34 is provided with a coil spring 42 anchored at the upper end to the boss 38, and at the lower end secured to sleeve 34'. The spring 42 is tensioned to urge the rotary element 30 continuously away from the conveyer path, and in a clockwise direction, as viewed in Figs. 3 and 4.

As a stop for movement of yoke member 32 under the influence of spring 42, I provide an arm 44, which is also pivoted on the frame 40 from a bracket 46, but arm 44 is continuously urged in the opposite direction against a stop 48 by reason of a spring 50, extending from the frame 40 to the end of arm 44.

Figure 2:
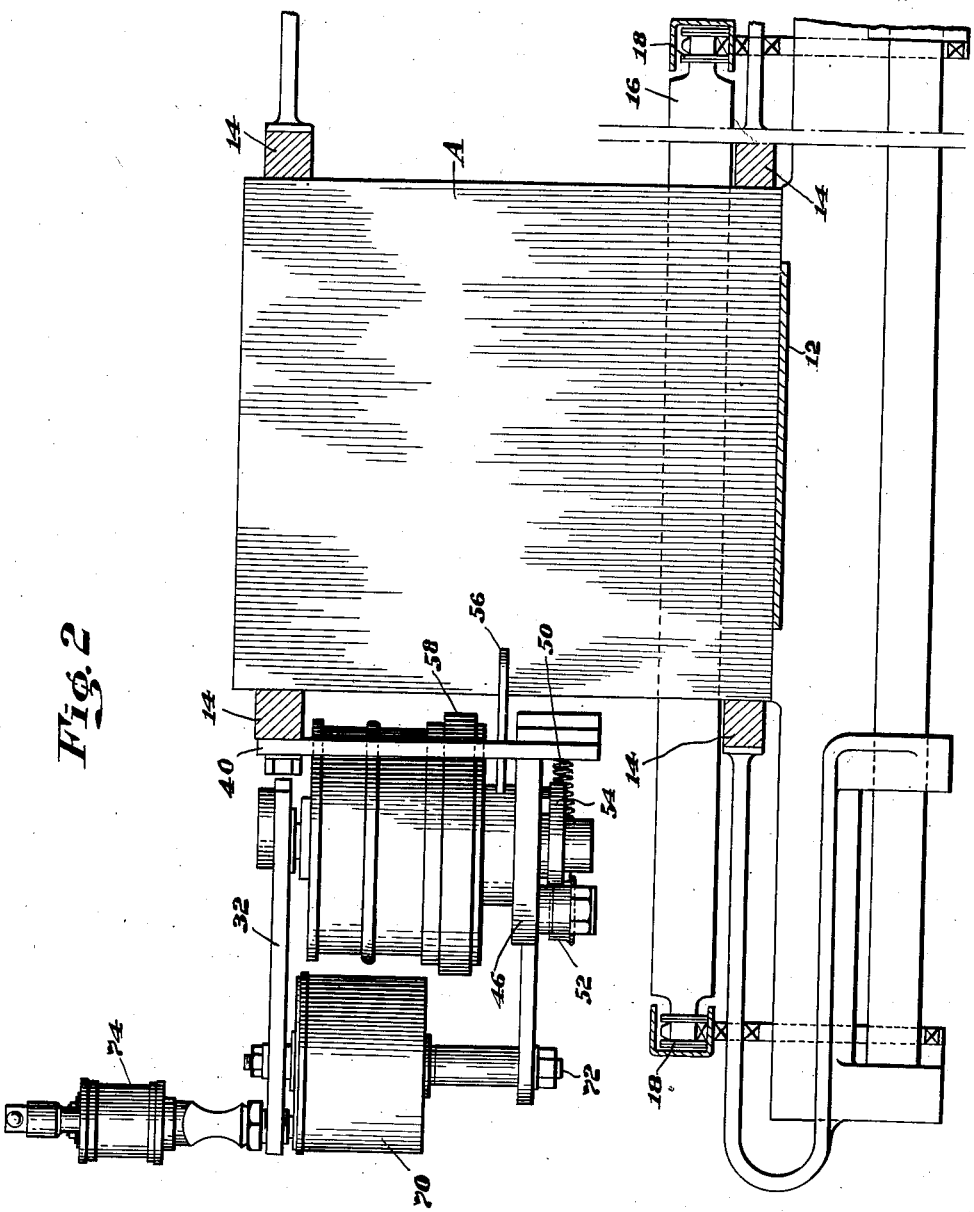
Fig. 2 is a cross sectional view taken along the line 2—2 of Fig. 1.

Arm 44 and yoke 32 are provided with cooperating cam members, which are held in engagement by the counter action of the springs 42 and 50. The cam means on arm 44 takes the form of a cam roller, shown as a ball bearing roller 52, while the cooperating element on yoke 32 is a cam 54, mounted on rotary element 30, coaxially thereof, below the lower arm of yoke 32, as shown in Figs. 1 and 2. The contour of cam 54 is best shown in Figs. 3 and 4, and includes a cylindrical lobe throughout the greater portion of its periphery, with a deep cut intervening offset in a relatively small portion of its periphery.

Figure 3:
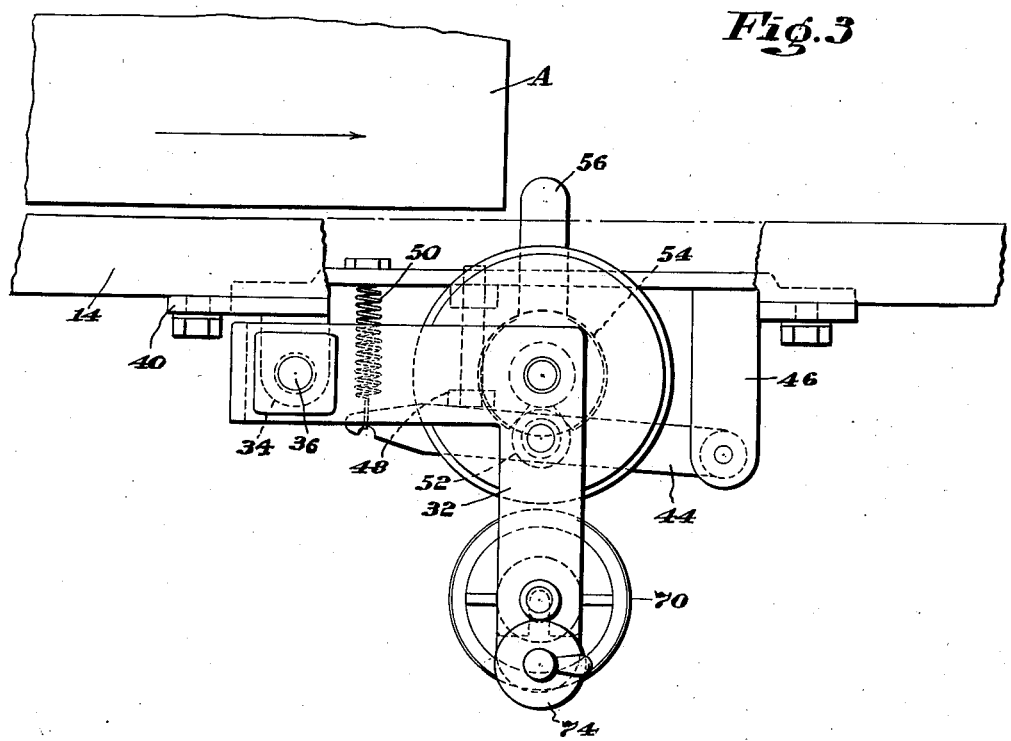
Fig. 3 is a plan view of the printing mechanism and adjacent conveyer frame partly broken away, showing diagrammatically an article in one position on the conveyer.

The normal inoperative neutral relative positions of yoke 32 and arm 44 are shown in Fig. 3, with the spring 50 holding arm 44 against stop 48, due to the fact that spring 50 is of greater strength than the coil spring 42, and with the cam roller 52 seated in the offset of cam 54.

Figure 4:
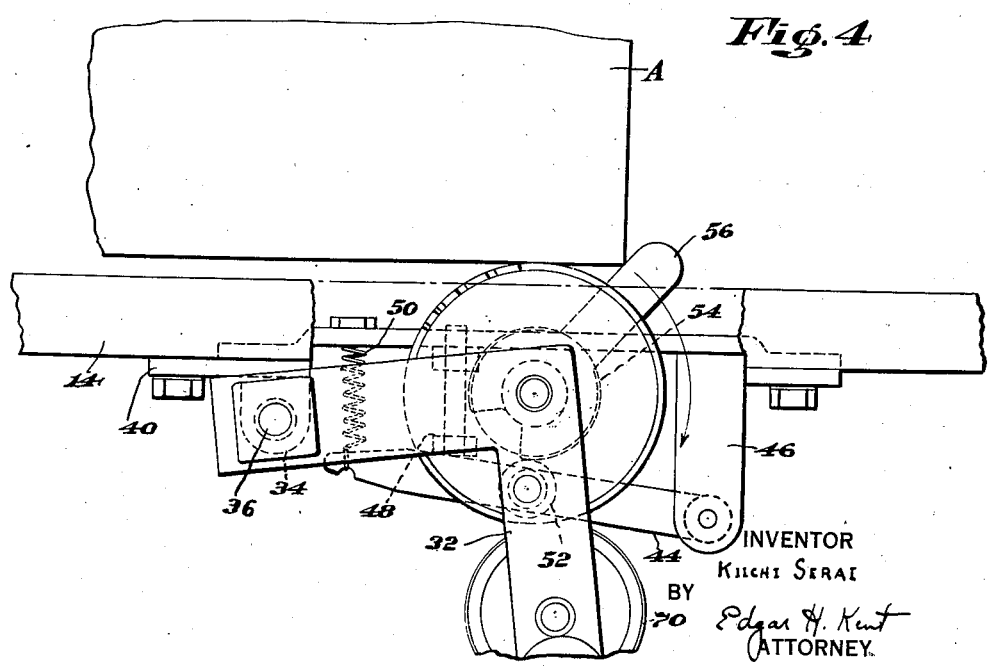
Fig. 4 is a similar plan view of the printing mechanism and adjacent conveyer frame, showing the position of the printing mechanism elements after the article has been carried by the conveyer to a more advanced position.

In order to move the yoke 32 from the position shown in Fig. 3 towards the conveyer path of travel, and to the position shown in Fig. 4, thereby carrying the print holder rotary element 30 towards the conveyer path of travel, the rotary element 30 is provided with an abutment member 56, which projects into the conveyer path of travel as shown in Fig. 3, and to a position where it is frictionally rotated, in a clockwise direction as shown in Fig. 3, by an article A advancing along the conveyer, until the abutment member is moved out of the path of travel of the advancing article. Such rotation of the abutment member causes yoke 32 to swing away from arm 44 as cam roller 52 rises onto the lobe of cam 54.

Further rotary motion of the rotary element 30, including cam 54 and abutment member 56, is caused by the resulting frictional engagement of a rubber drive ring 58, supported on element 30, with the side of the advancing article, such engagement being positively maintained by the spring 50.

Type 59 may be mounted if desired in two lines, as shown, on the rotary element 30, and may be held in position against the periphery thereof, by any suitable means such as a circular coil spring 60. Thus, as the rotary element 30 is rotated by drive ring 58, the type contacts the side of the article at a predetermined distance from its leading end, and at a fixed height, dependent upon the exact position of the type on the periphery of the type holder.

The rotary element is designed so that the external circumference of the rubber drive ring 58 slightly exceeds the length of the articles to be operated upon. Thus, as the rubber drive ring 58 reaches the rear end of the article, the abutment 56 has already passed back into the path of travel of articles on the conveyer slightly behind the article, and the roller 52 has reached the end of the lobe of cam 54 due to the rotation of said cam with member 30. As the roller 52 reaches the end of the lobe of cam 54, the pressure of spring 42 forces it to ride along the beveled side of the offset portion of the cam 54, permitting yoke 32 to return to its initial position adjacent arm 44 under the action of spring 42.

It will be obvious that the rotary element 30 may be replaced by type holders of slightly different circumference to accommodate the mechanism for operation on articles of different lengths.

However, so long as articles of identical length are advanced in spaced relation along the conveyer, the mechanism above described will operate to print firmly and distinctly any desired notation on each advancing article at identical positions, regardless of the distance between the advancing articles, and regardless of any variation in the distance between successive articles.

In order to insure that the type 59 will be supplied continuously with sufficient ink or other printing material, I mount on yoke 32 a dispensing apparatus including a rotatable cylindrical inking roller 70 mounted for rotation on a shaft 72. The inking roller 70 can be supplied with ink from a sight feed ink reservoir 74 in a manner well known to the art. Since the type projects somewhat from the periphery of the rotary element 30, the parts are designed so that the type will contact the inking roller 70 with each revolution of the rotary element 30, thereby reinking the type for the succeeding impression. Operation of this reinking mechanism is well known, and equivalent mechanism might well be supplied.

I claim:

1. In a conveyer system having a frame defining a path of travel and a conveyer for advancing articles in spaced relation along said path, a rotary printing mechanism pivotally mounted on said frame adjacent said path of travel, said mechanism including a rotary print holder and a rotatable abutment member fixed to said print holder and adapted to project into said path of travel, and cam means on said frame and said print holder cooperating to pivot said print holder upon rotation of said member by said article into an operative position frictionally engaging a side of an article advancing on said conveyer and to release said holder to permit return thereof to an inoperative position remote from said path of travel after said print holder has rotated through a predetermined arc.

2. In a conveyer system having a frame defining a path of travel and a conveyer for advancing articles in spaced relation along said path, a rotary printing mechanism pivotally mounted on said frame adjacent said path of travel, said mechanism including a rotary print holder and a rotatable abutment member fixed to said print holder and adapted to project into said path of travel, cam means on said frame and said print holder cooperating to pivot said print holder upon rotation of said member by said article into an operative position frictionally engaging a side of an article advancing on said conveyer and means for returning said holder to an inoperative position remote from said path of travel after said print holder has rotated through a predetermined arc.

3. In a conveyer system having a frame defining a path of travel and a conveyer for advancing articles along said path, a rotary printing mechanism pivotally mounted on said frame adjacent said path of travel, said mechanism including a rotary print holder and a rotatable abutment member fixed to said print holder and adapted to project into said path of travel, an arm pivoted on said frame, and cam means on said arm and said print holder cooperating to pivot said print holder upon rotation of said member by said article, into an operative position frictionally engaging a side of an article advancing on said conveyer and to release said holder to permit return thereof to an inoperative position remote from said path of travel after said print holder has rotated through a predetermined arc.

4. In a conveyer system having a frame defining a path of travel and a conveyer for advancing articles along said path, a rotary printing mechanism pivotally mounted on said frame adjacent said path of travel, said mechanism including a rotary print holder and a rotatable abutment member fixed to said print holder and adapted to project into said path of travel, an arm pivoted on said frame, cam means on said arm and said print holder, means for continuously urging said arm towards a predetermined point spaced from said path of travel, means for maintaining said cam means in continuous cooperative engagement regardless of the position of said arm, said cam means cooperating to pivot said print holder into an operative position frictionally engaging a side of an article advancing on said conveyer upon rotation of said member by said article, and means for pivoting said holder to an inoperative position remote from said path of travel after said print holder has rotated through a predetermined arc.

5. A device of the character described comprising a frame, a yoke pivoted on said frame for movement in a horizontal plane, a rotary element journaled in said yoke, said rotary element including a peripheral print holder, cam means and a frictional engaging band, cooperating cam means mounted on said frame, means for maintaining said cam means in continuous cooperative engagement, and an abutment member fixed to said rotary element and projecting beyond the periphery of said band, said cam means being adapted to maintain said yoke in a pivoted operative position while said member rotates through a predetermined arc and being adapted to release said yoke to permit return thereof to an inoperative position while said member rotates through the remainder of its path of revolution.

6. A device of the character described comprising a frame, a yoke and an arm each pivoted on said frame for movement in a horizontal plane, cam means journaled on said yoke and said arm, means for maintaining said cam means in continuous cooperative engagement, a rotary element journaled in said yoke coaxially with said yoke cam means, said rotary element including a peripheral print holder and a frictional engaging band, and an abutment member fixed to said rotary element and projecting beyond the periphery thereof, said cam means being adapted to maintain said yoke in a pivoted operative position remote from said arm while said member passes through a predetermined arc adjacent said arm and being adapted to release said yoke to permit return thereof to an inoperative position adjacent said arm while said member rotates through the remainder of its path of revolution remote from said arm.

7. A device of the character described comprising a frame, a yoke and an arm each pivoted on said frame for movement in a horizontal plane, cam means journaled on said yoke and said arm, means for maintaining said cam means in continuous cooperative engagement, a rotary element journaled in said yoke coaxially with said yoke cam means, said rotary element including a peripheral print holder and a frictional engaging band, an abutment member fixed to said rotary element and projecting beyond the periphery thereof, said cam means being adapted to maintain said yoke in a pivoted operative position remote from said arm while said member passes through a predetermined arc adjacent said arm and being adapted to release said yoke to permit return thereof to an inoperative position adjacent said arm while said member rotates through the remainder of its path of revolution remote from said arm, a stop on said frame for said pivoted arm and means for continuously urging said pivoted arm towards said stop regardless of the position of said yoke relative to said arm.

8. A device of the character described comprising a frame, a yoke and an arm each pivoted on said frame for movement in a horizontal plane, cam means journaled on said yoke and said arm, means for maintaining said cam means in continuous cooperative engagement, a rotary element journaled in said yoke coaxially with said yoke cam means, said rotary element including a peripheral print holder and a frictional engaging band, an abutment member fixed to said rotary element and projecting beyond the periphery thereof, said cam means being adapted to maintain said yoke in a pivoted operative position remote from said arm while said member passes through a predetermined arc adjacent said arm and being adapted to release said yoke to permit return thereof to an inoperative position adjacent said arm while said member rotates through the remainder of its path of revolution remote from said arm, a stop on said frame for said pivoted arm, means for continuously urging said pivoted arm towards said stop regardless of the position of said yoke relative to said arm, and an inking roller journaled in said yoke and adapted for frictional peripheral engagement with print carried by said rotary element.

KIICHI SERAI.